(12) United States Patent
Chauhan et al.

(10) Patent No.: US 10,768,956 B2
(45) Date of Patent: *Sep. 8, 2020

(54) DYNAMIC CLOUD STACK TESTING

(71) Applicant: Bank of America Corporation, Charlotte, NC (US)

(72) Inventors: Sandeep Kumar Chauhan, Hyderabad (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,048

(22) Filed: Sep. 20, 2019

(65) Prior Publication Data

US 2020/0012504 A1 Jan. 9, 2020

Related U.S. Application Data

(63) Continuation of application No. 15/684,882, filed on Aug. 23, 2017, now Pat. No. 10,423,432.

(51) Int. Cl.
*G06F 9/455* (2018.01)
*G06F 9/50* (2006.01)
*H04L 29/08* (2006.01)
*G06F 11/36* (2006.01)

(52) U.S. Cl.
CPC .......... *G06F 9/455* (2013.01); *G06F 9/5072* (2013.01); *G06F 11/36* (2013.01); *H04L 67/34* (2013.01); *H04L 67/10* (2013.01)

(58) Field of Classification Search
CPC ....... G06F 9/455; G06F 9/5072; H04L 67/34; H04L 67/10
See application file for complete search history.

(56) References Cited

U.S. PATENT DOCUMENTS

| | | |
|---|---|---|
| 8,255,529 B2 | 8/2012 | Ferris et al. |
| 8,271,653 B2 | 9/2012 | DeHaan |
| 8,316,125 B2 | 11/2012 | DeHaan |
| 8,402,139 B2 | 3/2013 | Ferris et al. |
| 8,504,689 B2 | 8/2013 | Ferris et al. |
| 8,799,997 B2 | 8/2014 | Spiers et al. |
| 8,909,784 B2 | 12/2014 | Ferris et al. |
| 8,984,610 B2 | 3/2015 | Spiers et al. |
| 9,209,979 B2 | 12/2015 | Spiers et al. |
| 9,354,939 B2 | 5/2016 | Ferris et al. |
| 9,419,913 B2 | 8/2016 | Ferris et al. |

(Continued)

*Primary Examiner* — Michael A Keller
(74) *Attorney, Agent, or Firm* — Michael A. Springs

(57) ABSTRACT

A dynamic cloud stack testing system comprises a cloud network with cloud components and a cloud stack server coupled to the network. The server includes an interface, a memory, a cloud stack configuration engine, and a cloud stack testing engine. The interface receives a cloud stack request from a user device that includes functionality parameters. The memory stores historic cloud stack combinations. The cloud stack configuration engine identifies cloud components associated with the functionality parameters and determines a cloud stack configuration that incorporates them. The cloud stack testing engine determines a cloud stack configuration test. The cloud stack testing engine executes the test, and stores results and the associated cloud stack configuration in the memory.

17 Claims, 3 Drawing Sheets

(56) References Cited

U.S. PATENT DOCUMENTS

| | | | |
|---|---|---|---|
| 2014/0195853 A1* | 7/2014 | Singh | G06F 11/2294 714/33 |
| 2017/0126763 A1* | 5/2017 | Bae | H04N 21/23 |
| 2019/0065274 A1 | 2/2019 | Chauhan et al. | |
| 2019/0068445 A1 | 2/2019 | Chauhan et al. | |

* cited by examiner

DYNAMIC CLOUD STACK TESTING

CROSS-REFERENCE TO RELATED APPLICATIONS

This application is a continuation of U.S. patent application Ser. No. 15/684,882 filed Aug. 23, 2017, by Sandeep Kumar Chauhan et al., and entitled "Dynamic Cloud Stack Testing," which is incorporated herein by reference.

TECHNICAL FIELD

The present invention relates generally to cloud computing and, more specifically, to dynamic cloud stack testing.

BACKGROUND

Many enterprises have expansive networks that include a large number of network devices running various applications. To support the diverse number of applications, these network devices may engage in cloud computing through access to a cloud network. A cloud stack describes the various layers of a cloud computer service model, including software as a service (SaaS), platform as a service (PaaS), and infrastructure as a service (IaaS). Each layer of the cloud stack describes a number of various physical and virtual resources provided to the network device, including hypervisors, virtual machines, operating systems, applications, and/or cloud management tools. In order for the cloud stacks to provide the necessary functions, they must be appropriately configured to match a user's needs. However, current cloud stack configuration techniques may be limited.

SUMMARY

In accordance with the present disclosure, the systems and methods described in the present application provide a number of network-centric technical solutions that allow for an optimized cloud stack configuration. An optimized cloud stack configuration allows network devices to run an application efficiently, while minimizing network communication errors and/or performance degradation. Embodiments of the present disclosure utilize an unconventional method of improving the operation of network devices by providing a more optimal cloud stack configuration.

In one embodiment, a dynamic cloud stack configuration system includes a cloud network, where the cloud network comprises a plurality of cloud components. The system also includes a cloud stack server communicatively coupled to the cloud network. The cloud stack server includes an interface, a memory, and a cloud stack configuration engine implemented by a processor. The cloud stack configuration engine is communicatively coupled to the memory and the interface. The interface is operable to receive a cloud stack request from a user device, and the cloud stack request includes one or more functionality parameters. The memory is operable to store a plurality of historic cloud stack configurations. Each of the plurality of historic cloud stack configurations is associated with one or more functionality parameters. The cloud stack configuration engine is configured to identify one or more cloud components associated with the functionality parameters. The cloud stack configuration engine is further configured to determine a cloud stack configuration, where the cloud stack configuration incorporates the one or more cloud components, and determine whether the cloud stack configuration is an optimal cloud stack configuration by analyzing the historic cloud stack configurations. In response to determining that the cloud stack configuration is an optimal cloud stack configuration, the cloud stack configuration engine is further configured to construct the cloud stack configuration, and implement the cloud stack configuration at the user device.

In one embodiment, a method for dynamic cloud stack configuration includes receiving, by an interface, a cloud stack request from a user device. The cloud stack request includes one or more functionality parameters and a cloud stack comprises one or more cloud components. The method further includes identifying, by a processor communicatively coupled to the interface, one or more cloud components associated with the functionality parameters. The method further includes determining, by the processor, a cloud stack configuration, where the cloud stack configuration incorporates the one or more cloud components. The method further includes determining, by the processor, whether the cloud stack configuration is an optimal cloud stack configuration by analyzing historic cloud stack configurations, and in response to determining that the cloud stack configuration is an optimal cloud stack configuration, constructing, by the processor, the cloud stack configuration when the cloud stack configuration is an optimal cloud stack configuration. Finally the method includes implementing, by the interface, the cloud stack configuration at the user device.

In one embodiment, a non-transitory computer-readable medium encoded with logic, is operable, when executed, to receive a cloud stack request from a user device, where the cloud stack request includes one or more functionality parameters and a cloud stack comprises one or more cloud components. The logic is further operable to identify one or more cloud components associated with the functionality parameters and determine a cloud stack configuration, wherein the cloud stack configuration incorporates the one or more cloud components. The logic is further operable to determine whether the cloud stack configuration is an optimal cloud stack configuration by analyzing historic cloud stack configurations, and in response to determining that the cloud stack configuration is the optimal cloud stack configuration, construct the cloud stack configuration. Finally, the logic is operable to implement the cloud stack configuration at the user device.

In one embodiment, a dynamic cloud stack testing system comprises a cloud network comprising a plurality of cloud components and a cloud stack server communicatively coupled to the cloud network. In some embodiments, the cloud stack server includes an interface, a memory, a cloud stack configuration engine, and a cloud stack testing engine. The interface is operable to receive a cloud stack request from a user device, where the cloud stack request includes one or more functionality parameters. The memory is operable to store a plurality of historic cloud stack combinations. The cloud stack configuration engine is implemented by a processor operably coupled to the memory and the interface. The cloud stack configuration engine is configured to identify one or more cloud components associated with the functionality parameters and determine a cloud stack configuration, where the cloud stack configuration incorporates the one or more cloud components. The cloud stack configuration engine is further configured to determine whether the cloud stack configuration is a unique cloud stack configuration by comparing the cloud stack configuration to the plurality of historic cloud stack configurations. The cloud stack testing engine is implemented by the processor. The cloud stack testing engine is configured to, in response to determining that the cloud stack configuration is the unique cloud stack combination, determine a cloud stack configuration test. The cloud stack testing engine is further configured to execute the cloud stack configuration test for the cloud stack configuration, and store results of the cloud stack configuration test and the associated cloud stack configuration in the memory.

In one embodiment, a method for dynamic cloud stack testing includes receiving, by an interface, a cloud stack request from a user device, where the cloud stack request includes one or more functionality parameters and a cloud stack comprises one or more cloud components. The method further includes identifying, by a processor communicatively coupled to the interface, one or more cloud components associated with the functionality parameters and determining, by the processor, a cloud stack configuration, where the cloud stack configuration incorporates the one or more cloud components. The method further includes determining, by the processor, that the cloud stack configuration is a unique cloud stack configuration by comparing the cloud stack configuration to a plurality of historic cloud stack configurations and executing, by the processor, a cloud stack configuration test for the cloud stack configuration. Finally, the method includes storing, in the memory, results of the cloud stack configuration test and the associated cloud stack configuration.

In one embodiment, a non-transitory computer-readable medium encoded with logic, is operable, when executed, to receive a cloud stack request from a user device, where the cloud stack request includes one or more functionality parameters and a cloud stack comprises one or more cloud components. The logic is further operable to identify one or more cloud components associated with the functionality parameters and determine a cloud stack configuration, where the cloud stack configuration incorporates the one or more cloud components. The logic is further operable to determine that the cloud stack configuration is a unique cloud stack configuration by comparing the cloud stack configuration to a plurality of historic cloud stack configurations. Finally, the logic is operable to execute a cloud stack configuration test for the cloud stack configuration, and store results of the cloud stack configuration test and the associated cloud stack configuration.

In a particular embodiment, a dynamic cloud stack tuning system comprises a cloud network comprising a plurality of cloud components and a cloud stack server communicatively coupled to the cloud network. The cloud stack server comprises an interface, a cloud stack configuration engine, and a cloud stack tuning engine. The interface receives a cloud stack request from a user device, wherein the cloud stack request includes one or more functionality parameters, and receives network usage parameters. The cloud stack configuration engine is implemented by a processor operably coupled to the interface, and identifies one or more cloud components associated with the functionality parameters. The cloud stack configuration engine further implements a cloud stack configuration, where the cloud stack configuration incorporates the one or more cloud components. The cloud stack tuning engine is implemented by the processor, and determines a performance decrease of the cloud stack configuration using the network usage parameters. The cloud stack tuning engine further reconfigures the cloud stack configuration by implementing a new cloud component in the cloud stack configuration.

In one embodiment, a method for dynamic cloud stack tuning comprises receiving, at an interface, a cloud stack request from a user device, where the cloud stack request includes one or more functionality parameters and a cloud stack comprises a plurality of cloud components. The method further includes receiving, at the interface, network usage parameters, and identifying, by a processor communicatively coupled to the interface, one or more cloud components associated with the functionality parameters. The method also includes implementing, by the processor, a cloud stack configuration where the cloud stack configuration incorporates the one or more cloud components. The method further includes determining, by the processor, a performance decrease of the cloud stack configuration using the network usage parameters, and reconfiguring the cloud stack configuration by implementing a new cloud component in the cloud stack configuration.

In one embodiment, a non-transitory computer-readable medium encoded with logic is operable, when executed, to receive a cloud stack request from a user device, where the cloud stack request includes one or more functionality parameters and a cloud stack comprises a plurality of cloud components. The logic is further operable to receive network usage parameters and identify one or more cloud components associated with the functionality parameters. The logic is further operable to implement a cloud stack configuration where the cloud stack configuration incorporates the one or more cloud components. Finally, the logic is operable to determine a performance decrease of the cloud stack configuration using the network usage parameters, and reconfigure the cloud stack configuration by implementing a new cloud component in the cloud stack configuration.

Certain embodiments of the present disclosure may provide one or more technical advantages. In certain embodiments, a system for dynamic cloud stack configuration may save and access historic cloud stack configurations and associated performance tests. This reduces or eliminates the need to build, reconfigure, and test a cloud stack configuration that has previously been used, thus limiting or reducing the computational resources used by a cloud stack server. In some embodiments, the cloud stack server utilizes previous cloud stack configurations and analyzes their performance metrics to ensure it will work properly, thus avoids implementing a faulty cloud stack configuration, and thus saves computational resources. This also prevents any retesting of a cloud stack configuration that already exists and has test data associated with it. In certain embodiments, a system for dynamic cloud stack configuration may analyze a cloud stack configurations network parameters to determine whether it is an optimal cloud stack configuration for the needs of a user, and if it is not optimal, then the system may replace a cloud component of the cloud stack configuration. By preemptively monitoring and analyzing the cloud stack configuration, as well as replacing any potentially faulty cloud components, the system may avoid future issues or malfunctions, thus saving computation resources required to test and fix the system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Ensuring that a network device uses the proper configuration of cloud computing components presents a number of network-centric technical challenges. Additionally, enterprises may encounter load changes or other shifts in the cloud network that affect the operation of a cloud stack configuration. One of the technical challenges faced by cloud computing is improperly configured cloud stacks, which may lead to application errors, performance degradation, or suboptimal application execution. For example, a network device may need to run a specific application. However, the application may only run on a specific operating system. Configuring the cloud stack to include the proper operating system may also require utilizing a specific virtual machine.

Because an enterprise may have a number of cloud computing resources (e.g., cloud components) at various layers of the cloud stack, another technical challenge is ensuring that a novel stack combination is capable of executing the required functionality requested by a network device. For example, during periods of high use, a requested stack combination may be unavailable and alternative cloud components may be used instead. Conventional cloud services may simply wait until the preferred stack combination is available and, thus, the network device may not be able to run the desired application. Thus, the teachings of this disclosure recognize that it would be desirable to provide dynamic cloud stack configurations that are optimized for the characteristics of the cloud requested by a user. Further, the teachings of this disclosure recognize that it would be desirable to provide dynamic cloud stack testing and tuning to ensure that the configured cloud stack is optimally designed; and if not, it can be reconfigured.

Figure 1:
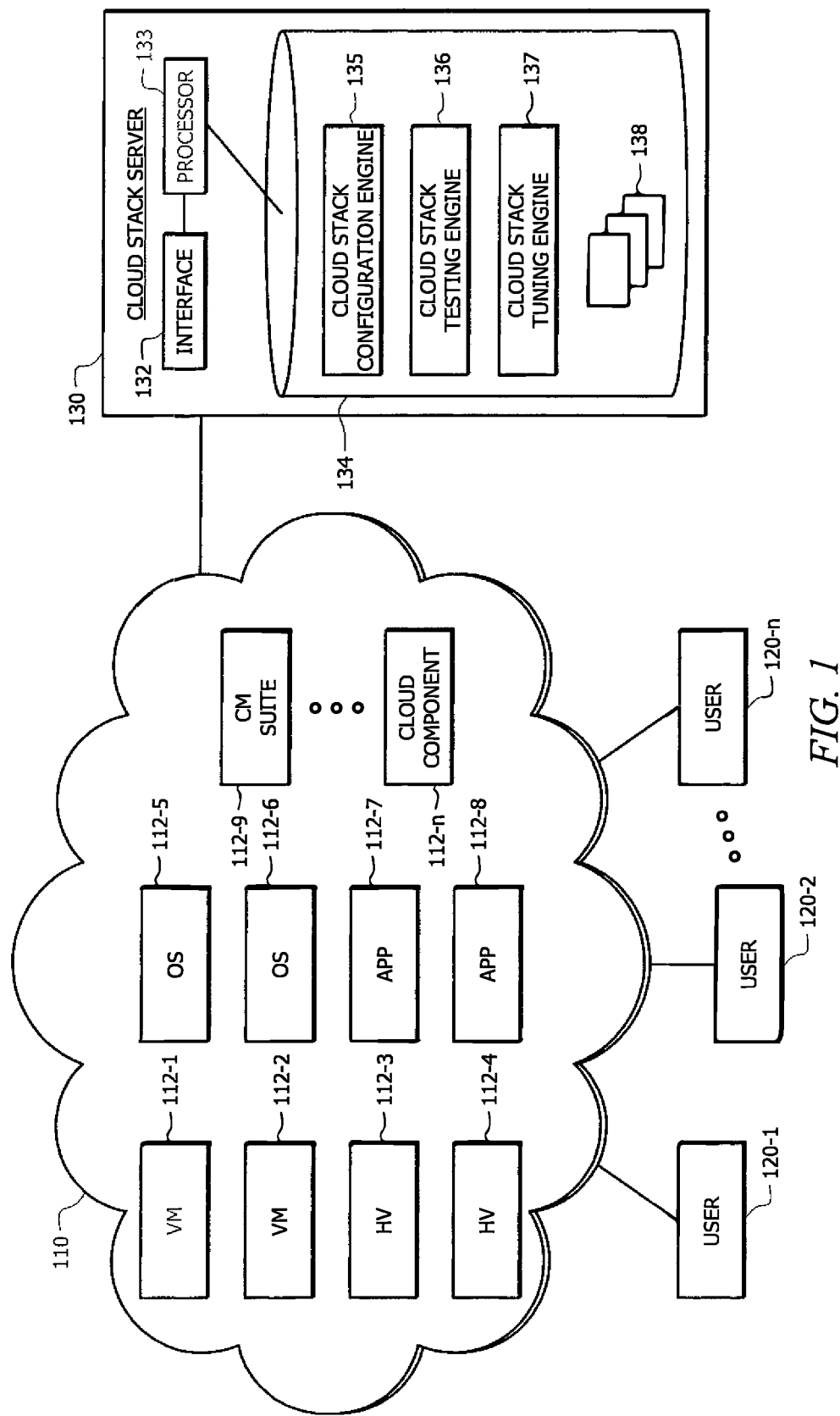
FIG. 1 illustrates a schematic diagram of a dynamic cloud stack configuration system, according an embodiment.
Figure 2:
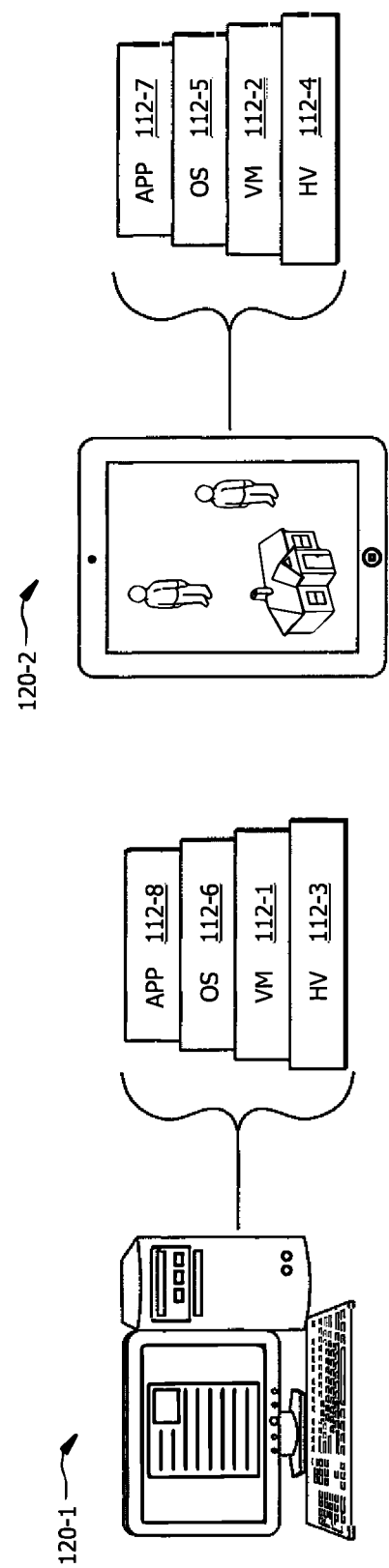
FIG. 2 illustrates an example cloud stack configuration for network devices, according to an embodiment.
Figure 3:
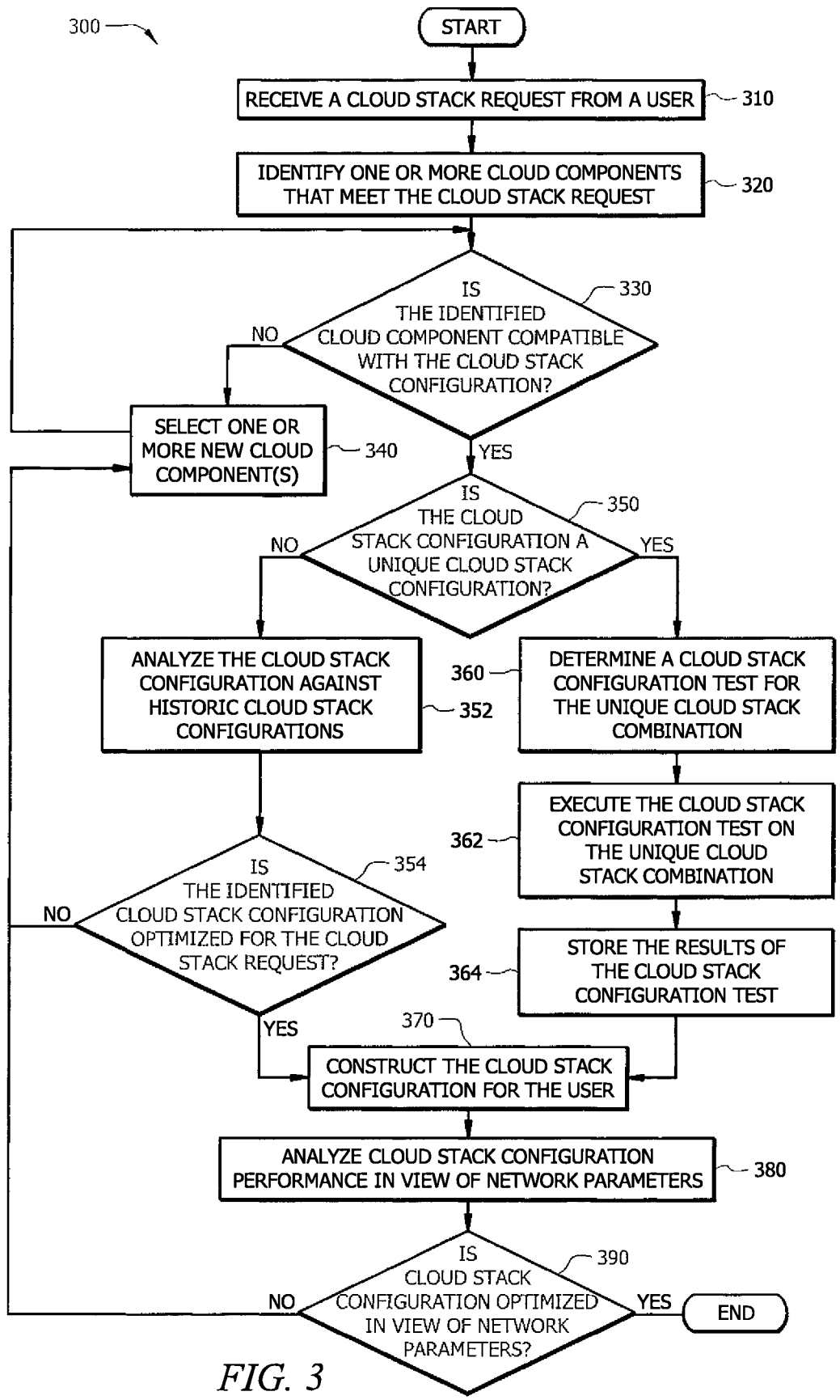
FIG. 3 illustrates an example flowchart for facilitating cloud stack configuration, cloud stack testing, and cloud stack tuning, using the system of FIG. 1.

Embodiments of the present disclosure and its advantages are best understood by referring to FIGS. 1-3, like numerals being used for like and corresponding parts of the various drawings.

FIG. 1 illustrates a schematic diagram of a dynamic cloud stack configuration system 100, according an embodiment. Dynamic cloud stack configuration system 100 comprises one or more users 120, cloud network 110, and cloud stack server 130. Cloud or cloud network 110 may comprise one or more cloud components 112, specifically virtual machines 112-1 and 112-2, hypervisors 112-3 and 112-4, operating systems 112-5 and 112-6, applications 112-7 and 112-8, CM Suites 112-9, and/or any other cloud components necessary to configure the stack of cloud network 110. Cloud stack server 130 may comprise interface 132, processor, 133, and memory 134. Memory 134 may comprise historic cloud stack configurations and associated data 138, and may comprise one or more engines or modules, specifically cloud stack configuration engine 135, cloud stack testing engine 136, and cloud stack tuning engine 137. System 100 is generally operable to facilitate cloud stack configuration, testing, and tuning, as described below.

In general, system 100 facilitates cloud stack configuration ensuring that the cloud stack created is optimal for a user's requirements and necessities. For example, an enterprise may need to set up a cloud stack so that all of its employees may access shared applications for work (e.g., email system). As another example, an enterprise may need to set up a cloud stack for its customers or users to access files or applications (e.g., cloud-based storage, accounts of users). System 100 may receive the cloud stack request from a user, determine cloud components that meet the cloud stack request and configure the cloud stack. System 100 may further create a test to perform on the cloud stack to determine whether it would properly serve the user. Based on the results from the designed test, system 100 may tune the cloud stack such that it is optimal for a user's need. System 100 may further tune the cloud stack at any point to ensure that the cloud stack remains optimal for the user. System 100 may further save information regarding historic cloud stack configurations to maintain a database of available cloud stacks that may be configured, and save operation data to keep track of the performance of a cloud stack.

User devices 120-1, 120-2, to 120-*n* may refer to any device that facilitates a user interacting with cloud network 110. In some embodiments, user device 120 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. In some embodiments, user device 120-*n* runs one or more virtual machines by utilizing cloud network 110. User device 120 may also comprise any suitable user interface such as a display, microphone, keyboard, or any other appropriate terminal equipment usable by a user. System 100 may comprise any number and combination of user devices 120. Users may utilize user device 120 to interact with cloud network 110, such as streaming content, saving files, or utilizing programs. User device 120 may be communicatively coupled to cloud network 110. User device 120 may interact with cloud stack server 130 by sending a cloud stack request. In some embodiments, a user may be an administrator, employee, and/or customer of an enterprise that utilizes cloud network 110 and/or cloud stack server 130.

Cloud network 110 may represent a combination of servers, storage, network devices, applications, or other components that may support an enterprises expansive network. By accessing cloud network 110, resources may be utilized remotely by multiple sources at once, for example, by cloud stack server 130 and/or user device 120. Cloud network 110 may include various layers that form the whole cloud stack and facilitate transporting data between each other for a function. The layers may include software as a service (SaaS), platform as a service (PaaS), and infrastructure as a service (IaaS). Each layer of the cloud stack may include a number of various physical and virtual resources provided to a network device, which are cloud components 112.

Cloud components 112 may comprise virtual machines 112-1 and 112-2, hypervisors 112-3 and 112-4, operating systems 112-5 and 112-6, applications 112-7 and 112-8, and/or cloud management tools 112-9. Cloud network 110 may include any number of cloud components 112. In some embodiments, each type of cloud component (e.g., virtual machine, hypervisor, etc.) may include multiple options (e.g., virtual machine 112-1 indicating one option and virtual machine 112-2 indicating another option). Although indicated as a discrete number of options in FIG. 1 (e.g., virtual machine 112-1 and 112-2), each type of cloud component may have any number of options for cloud stack server 130 to select among. Each option of components 112 may be associated with specific characteristics or qualities, known as functionality parameters. For example, certain hypervisors may be hosted hypervisors, while other hypervisors may be native hypervisors. The type of hypervisors (hosted vs. native) may provide various trade-offs and benefits to the cloud stack configuration. For example, if operating speed is a necessary requirement requested by user device 120-2, then cloud stack configuration engine 135 may determine that a native hypervisor is required in the cloud stack. If user device 120-1 requests a quick setup and broad compatibility, then a hosted hypervisor may be a preferred hypervisor in the cloud stack. Each hypervisor 112-3 and 112-4 may be associated with certain functionality parameters. These functionality parameters may provide information to cloud stack server 130 regarding which hypervisor 112-1 or 112-2 to select for user device 120 based on the requested functionality parameters sent in the cloud stack request by a user. As another example, if the enterprise wants to be cost-effective and save money, then it may have a preference for open source models. This functionality parameter of a preference for open source may indicate which components 112 may be the best fit for a user or enterprise's cloud stack.

Virtual machines 112-1 and 112-2 may facilitate running an operating system and may imitate dedicated hardware. Virtual machines 112- and 112-2 may represent different types of virtual machines that may be selected by cloud stack server 130 to configure a cloud stack for a user. Cloud network 110 may provide for any number of options on the virtual machines (e.g., 112-1 to 112-*n*) to use in a user's cloud stack. Each virtual machine 112-1, 112-2 may have unique characteristics and functionality parameters associated with it. For example, one virtual machine (e.g., virtual machine 112-1) may be optimized for high computation power, while another (e.g., virtual machine 112-2) may be optimized for memory and more useful in memory-intensive applications. Cloud stack server 130 may use these functionality parameters associated with each available virtual machine 112-1 or 112-2 to make a selection for a user's specific cloud stack.

Operating systems 112-5 and 112-6 may be system software that managers any running computer programs or applications. Operating systems 112-5 and 112-6 may represent different types of operating systems that may be selected by cloud stack server 130 to configure a cloud stack for a user. Cloud network 110 may provide for any number of options on the operating systems (e.g., 112-5 to 112-*n*) to use in a user's cloud stack. Examples of operating systems may include Microsoft Windows, macOS, Linux, Unix, etc. Each operating system 112-5 and 112-6 may have unique characteristics and functionality parameters associated with it. For example, one operating system 112-5 may be a single-tasking system that can only run one program at a time, while a multi-tasking operating system allows for more than one program to be running. Further, operating systems may perform the multitasking in different ways, such as preemptive multitasking or cooperative multitasking. Cloud stack server 130 may use these characteristics and functionality parameters associated with each operating system 112-5 and 112-6 to make a selection for a user's specific cloud stack.

Applications 112-7 and 112-8 may be computer programs designed to perform a group of coordinated functions, tasks, or activities for the benefit of the user. Applications 112-7 and 112-8 may represent different types of applications that may be selected by cloud stack server 130 to configure a cloud stack for a user. Cloud network 110 may provide for any number of options on the applications (e.g., 112-7 to 112-*n*) to use in a user's cloud stack. Examples of applications include word processing, spreadsheets, databases, presentations, email, or any other program utilized by a user. Each application 112-7 and 112-8 may have unique characteristics and functionality parameters associated with it. For example, one application may be used to send emails to other users and another application may be used to play multi-player games. Cloud stack server 130 may use these characteristics and functionality parameters associated with each application 112-7 and 112-8 to make a selection for a user's specific cloud stack.

Cloud management ("CM") suite or cloud management platform 112-9 is a component for managing the cloud computing products and services provided by cloud network 110. The CM suite may include specific policies or controls in how to manage access, security, computational, network, storage, and other resources across multiple domains. CM suite 112-9 may represent different types of CM suites that may be selected by cloud stack server 130 to configure a cloud stack for a user. Cloud network 110 may provide for any number of options on the CM suites (e.g., 112-9 to 112-*n*) to use in a user's cloud stack. Each CM suite 112-9 may have unique characteristics and functionality parameters associated with it. For example, one CM suite may provide for high security and another CM suite may be used to ensure remote access to multiple users. Cloud stack server 130 may use these characteristics and functionality parameters associated with each CM suite 112-9 to make a selection for a user's specific cloud stack.

Cloud stack server 130 may be used by an enterprise or business to configure, testing, and tune cloud stacks. Generally, cloud stack server 130 may receive a request from user device 120 indicating the functionality parameters that a user may require or need for the user's cloud stack. Cloud stack server 130 may configure the cloud stack, test the cloud stack to ensure successful operation, and may tune or reconfigure the cloud stack based on the test results. Cloud stack server 130 may be communicatively coupled to cloud network 110 and users 120-*n*. In some embodiments, cloud stack server may comprise interface 132, processor 133, and memory 134.

Memory 134 may refer to any suitable device capable of storing and facilitating retrieval of data and/or instructions. Examples of memory 134 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates memory 134 as internal to cloud stack server 310, it should be understood that memory 134 may be internal or external to cloud stack server 310, depending on particular implementations. Also, memory 134 may be separate from or integral to other memory devices to achieve any suitable arrangement of memory devices for use in system 100.

Memory 134 is generally operable to store various engines, such as cloud stack configuration engine 135, cloud stack testing engine 136, and cloud stack tuning engine 137, which are explained further below. Each engine may comprise algorithms, code, tables, and/or other suitable instructions for performing the described functions and operations. These engines may be predetermined or predefined, but may also be updated or amended based on the needs of the enterprise or cloud server 130.

Historic cloud stack configurations 138 may be stored in memory 134. Historic cloud stack configurations 138 may be information about cloud stacks that were previously configured and/or used in system 100. Historic cloud stack configurations 138 may include information about the cloud stack itself, as well as the various components included in the cloud stack, such as the specific virtual machine 112-1 and 112-2, hypervisor 112-3 and 112-4, operating system 112-5 and 112-6, applications 112-7 and 112-8, CM suite 112-9, and any other cloud components 112-n. Historic cloud stack configurations 138 may contain data about the cloud stack request (and corresponding requirements or functionality parameters given by the user) that it was created in response to. Historic cloud stack configurations 138 may further contain functionality parameters associated with each cloud component 112-n, testing data from when each cloud stack was tested, and historic cloud stack performance metrics. Each of these historic cloud stack performance metrics may be associated with one or more functionality parameters. For example, the historic cloud stack performance metrics may indicate the cloud stack's performance regarding, for example, speed, security, and peak load information. Cloud stack server 130 may access historic cloud stack configurations 138, for example, to determine whether a cloud stack is unique or not. If a cloud stack is not unique (e.g., it is a historic cloud stack configurations 138 and has been utilized before), then cloud stack server 130 may access the data associated with it to determine whether the particular cloud stack is a good fit for user 120-1 based on the cloud stack request and associated functionality parameters. By saving and accessing historic cloud stack configurations 138, cloud stacker server 130 may avoid having to build, reconfigure, and test a cloud stack that has previously been used, thus limiting or reducing the computational resources used by cloud stack server 130. The engines (e.g., cloud stack configuration engine 135, cloud stack testing engine 136, and cloud stack tuning engine 137) may utilize historic cloud stack configurations 138, in some operations.

Memory 134 communicatively couples to processor 133. Processor 133 is generally operable to execute tasks from engines (e.g., cloud stack configuration engine 135, cloud stack testing engine 136, and cloud stack tuning engine 137) stored in memory 134 to configure cloud stacks, according to the disclosure. Processor 133 may comprise any suitable combination of hardware and software implemented in one or more modules to execute instructions and manipulate data to perform the described functions for cloud stack server 130. In some embodiments, processor 133 may include, for example, one or more computers, one or more central processing units (CPUs), one or more microprocessors, one or more applications, and/or other logic.

In some embodiments, communication interface 132 is communicatively coupled to processor 133 and may refer to any suitable device operable to receive input for cloud stack server 130, send output from cloud stack server 130, perform suitable processing of the input or output or both, communicate to other devices, or any combination of the preceding. Communication interface 132 may include appropriate hardware (e.g., modem, network interface card, etc.) and software, including protocol conversion and data processing capabilities, to communicate through cloud network 110 or other communication system that allows cloud stack server 130 to communicate to other devices. Communication interface 132 may include any suitable software operable to access data from various devices such as user devices 120. Communication interface 132 may also include any suitable software operable to transmit data to various devices such as user devices 115. Communication interface 132 may include one or more ports, conversion software, or both. In general, communication interface 132 may receive a request to receive a cloud stack request from user device 120, receive one or more functionality parameters within the cloud stack request, receive network usage parameters, and implement the cloud stack configuration at user device 120.

In some embodiments, interface 132 of cloud stack server 130 may receive one or more cloud stack requests from user device(s) 120-n. Cloud stack server 130 may receive the request at interface 132, from user device (e.g., user 120-2), through cloud network 110. Interface 132 may provide this cloud stack request to processor 133 and/or any of the engines (e.g., cloud stack configuration engine 135, cloud stack testing engine 136, or cloud stack tuning engine 137). The cloud stack request may include one or more functionality parameters. The functionality parameters may be user input that describes the functionality and/or features that the user would like the user's cloud stack to support. The functionality parameters may include, but are not limited to, a hardware preference, an operating system preference, a preference for open source, a performance requirement, an intended application preference for high availability, the domain to which the business or enterprise belongs, and/or any other feature relating to the operation of cloud stack that the user is requesting cloud stack server 130 to create. The engines, discussed below, may use these functionality parameters to determine the best cloud components to include for a user's cloud stack. For example, when user device 120 creates a cloud stack request, a user may input various requirements for the system, or even for particular applications to be used by the cloud stack. User device 120 may provide input fields, drop-down menus, or any other way of collecting information from the user about characteristics required for a certain application. Examples of functionality parameters for applications may include access (e.g., 24/7 availability v. limited), criticality, support needed (e.g., in case an application malfunctions), resiliency, a number of users to be using the application at once, monitoring, and security. User device 120 may receive input regarding any layer of the cloud stack, and cloud stack server 130 may use these functionality parameters to determine which cloud components 112 to be used at each layer of the cloud stack to create an optimal cloud stack configuration for the user.

In some embodiments, interface 132 of cloud stack server 130 may receive network usage parameters. Network usage parameters may be characteristics and performance data indicative of the operation of cloud network 130. For example, network usage parameters may include a load shift in cloud network 130, the usage of a particular cloud component (e.g., any component 112), and/or a changed functionality parameter (e.g., if a user updates the cloud stack request, if a component changes a feature or functionality). Cloud stack server 130 may receive the network usage parameters at interface 132 from cloud network 110. Interface 132 may provide these network usage parameters to processor 133 and/or any of the engines (e.g., cloud stack configuration engine 135, cloud stack testing engine 136, or cloud stack tuning engine 137). Cloud stack server may use network usage parameters to monitor the performance of a cloud stack configuration.

Cloud stack configuration engine 135 may be included within cloud stack server 130. Generally, cloud stack configuration engine 135 may initiate a cloud stack configuration process, according to any one of a variety of embodiments suitable for a particular purpose. More specifically, cloud stack configuration engine 135 may be any software, hardware, firmware, or combination thereof capable of configuring a cloud stack for a user or user device 120-1 or 120-2. According to some embodiments, cloud stack configuration engine 135 may be a set of instructions stored in memory 134 that may be executed by processor 133. In some embodiments, cloud stack configuration engine 135 may receive a cloud stack request, determine which cloud components to use, and construct the cloud stack configuration for a user or user device 120-1. Further, cloud stack configuration engine 135 determines which specific functionality parameters from a cloud stack request would be best met by certain cloud components, and creates a cloud stack configuration using certain cloud components that is optimized for a cloud stack request.

In some embodiments, cloud stack configuration engine 135 identifies one or more cloud components associated with the functionality parameters received by interface 132. In some embodiments, the functionality parameters are a set of pre-selections and options that a user may choose between. In some embodiments, the functionality parameters may be in narrative form as input by a user, and cloud stack configuration engine 135 may analyze the narrative to determine the translate into functionality parameters. For example, cloud stack configuration engine 135 may review a user's input to find the work "open source" and determine that user has a preference for open source. As another example, cloud stack configuration engine 135 may determine the word Linux in the user input and determine that the user has a preference that a Linux operating system be used. Cloud stack configuration engine 135 may further use these determined or input functionality parameters to choose among various cloud components 112 that best suit a user's needs. In some embodiments, cloud components 112 may have a list of features or functionality parameters associated with each of them. cloud stack configuration engine 135 may compare the features associated with a component (e.g., hypervisor 112-3) with the functionality parameters from the user and determine a sufficient match such that it may identify hypervisor 112-3 as a selection for the cloud stack. Cloud stack configuration engine 135 may repeat this process in order to identify all cloud components 112 necessary to configure a cloud stack.

In some embodiments, cloud stack configuration engine 135 determines a cloud stack configuration that incorporates the one or more cloud components. In determining the configuration, cloud stack configuration engine 135 may reference historic cloud stack configurations 138, associated performance data, associated cloud stack requests, and machine learning. For example, cloud stack configuration engine 135 determine that another user had similar requirements as those in the current cloud stack request and that the configuration is operating well for that user. This information about the cloud stack request for historic cloud stack configurations 138 may be saved in memory 134 as associated with the specific historic cloud stack configuration. In that way, cloud stack configuration engine 135 may search through past cloud stack requests that have similar or the same functionality parameters as a current cloud stack request in order to quickly and efficiently uncover historic cloud stack configurations 138 that would match the current requirements. In this way, cloud stack configuration engine 135 would avoid selecting cloud components 112, configuring a cloud stack configuration, and testing the recommended cloud stack configuration because it already has data that this historical cloud stack configuration 138 would work well for the current user, thus conserving computational resources. As another example, users with similar requirements as those in the current cloud stack request (e.g., video streaming with a certain peak load) tried a certain configuration, but it did not work well because it had too many errors or performance degradation. By utilizing historic cloud stack configurations 138 and machine learning, cloud stack configuration engine is able to configure the optimal cloud stack for a user, with assurance that it will perform as needed for the request.

In some embodiments, cloud stack configuration engine 135 determines whether cloud component 112 is compatible with the cloud stack configuration. When selecting cloud components 112, cloud stack configuration engine 135 may do so based on functionality parameters and the ability of cloud component 112 to match the requirements of a user. Thus, cloud stack configuration engine 135 must further verify that selected cloud component 121 is compatible with the rest of the configured cloud stack. For example, a specific hypervisor may be selected because it matched certain functionality parameters input by the user and a specific operating system may be selected because it matched certain functionality parameters input by the user. Continuing the example, if that hypervisor is not compatible with the operating system, then the cloud stack configuration will not be optimal for the user. In some embodiments, cloud stack configuration engine 135 identifies an alternative cloud component to replace the cloud component that is incompatible with the cloud stack configuration. Continuing the example from above, cloud stack configuration engine 135 may review the functionality parameters and determine which cloud component 112 and its specific features are most important to the user (e.g., based on functionality parameters) and select that cloud component as remaining in the cloud stack. Cloud stack configuration engine 135 may then identify the hypervisor as the cloud component 112 to be replaced. Cloud stack configuration engine may review the functionality parameters, other hypervisors that are available, and select a hypervisor that is compatible with the specific operating system.

In some embodiments, cloud stack configuration engine 135 determines whether the cloud stack configuration is a unique cloud stack combination by comparing the cloud stack configuration to the plurality of historic cloud stack configurations 138. If the cloud stack configuration is unique, cloud stack testing engine 136 (discuss further below) may create and execute a test to determine whether it will adequately perform for the cloud stack request. If the cloud stack configuration is not unique, cloud stack configuration engine 135 analyzes historic cloud stack performance metrics (e.g., saved in association with historic cloud stack configurations 138) to determine whether the cloud stack is an optimal cloud stack configuration for the cloud stack request. In some embodiments, cloud stack configuration engine 135 uses a machine learning technique to determine whether the cloud stack configuration is the optimal cloud stack configuration. The performance metrics may include an error rate, a performance degradation rate, or any metric that reflects on the success or failure of the operation of the cloud stack. By analyzing a cloud stack's performance metrics, cloud stack configuration engine 135 can see whether the determined cloud stack would actually perform as dictated by the functionality parameters. For example, if a cloud stack request establishes a functionality parameter of video streaming with a certain peak load, but the cloud stack configuration had too many errors to meet the requirement, then cloud stack configuration engine 135 would not recommend that cloud stack configuration be used for this new cloud stack request. By utilizing previous cloud stack configurations and analyzing their performance metrics, cloud stack configuration engine 135 avoids implementing a faulty cloud stack configuration, and thus saves computational resources. This also prevents any retesting of a cloud stack configuration that already exists and has test data associated with it. Thus, cloud stack configuration engine 135 may simply analyze the performance metrics to determine whether the cloud stack configuration that it determined is optimal for the user or not. In some embodiments, cloud stack configuration engine 135 constructs the cloud stack configuration and/or implements the cloud stack configuration at user device 120. Cloud stack configuration engine 135 may construct the cloud stack configuration in response to determining that the cloud stack configuration is an optimal cloud stack configuration. Cloud stack configuration engine 135 may construct the cloud stack configuration in response to cloud stack testing engineer 136 executing and store the results of a cloud stack configuration test, discussed further below.

Cloud stack testing engine 136 may be included within cloud stack server 130. Generally, cloud stack testing engine 136 may create and execute one or more tests of a cloud stack configuration, according to any one of a variety of embodiments suitable for a particular purpose. More specifically, cloud stack testing engine 136 may be any software, hardware, firmware, or combination thereof capable of creating and executing a test of a cloud stack configuration. According to some embodiments, cloud stack testing engine 136 may be a set of instructions stored in memory 134 that may be executed by processor 133. In some embodiments, cloud stack testing engine 136 may receive a cloud stack request, determine which cloud components to use, and determine whether the cloud stack created is a unique cloud stack combination. If so, cloud stack testing engine 136 may create a cloud stack configuration test for that unique cloud stack combination, execute the test, and analyze the results of the test to determine whether the unique cloud stack combination would perform as necessary.

In some embodiments, in response to cloud stack configuration engine 135 (or cloud stack testing engine 136, in some embodiments) determining that the cloud stack configuration is the unique cloud stack combination, cloud stack testing engine 136 determines one or more cloud stack configuration tests to determine if the recommended cloud stack configuration provides the required functionality. Because the cloud stack configuration is unique, it has not been tested before and tests may indicate whether the cloud stack configuration will perform as needed. Cloud stack testing engine 136 may review the functionality parameters to ensure that the tests created measure whether those functionality parameters are met. Cloud stack testing engine 136 may write any number of tests, and indicate within each test the context (e.g., what functionality parameter or characteristic is being tested).

In some embodiments, cloud stack testing engine 136 executes the one or more cloud stack configuration test for the cloud stack configuration. Cloud stack testing engine 136 may run multiple tests at once or in sequence after the other. In some embodiments, when testing the cloud stack configuration, cloud stack testing engine 136 may determine that further tests need to be performed. For example, if one test indicates an issue, but cloud stack testing engine 136 cannot determine which cloud component(s) is causing the issue, then cloud stack testing engine 136 may perform an additional test to identify the issue. In some embodiments, cloud stack testing engine 136 may determine that certain tests need to be repeated. For example, a test may be repeated to verify the results (e.g., ensure that there was not an error with the test) and/or after a change is made to the cloud stack configuration (e.g., one cloud component 112 is replaced and thus the test needs to be executed again to see if the issue has been fixed).

In some embodiments, when executing the cloud stack configuration test, cloud stack testing engine 136 analyzes a performance of the cloud stack configuration when using the one or more functionality parameters. In some embodiments, when performing the cloud stack configuration test, the cloud stack testing engine 136 performs a functionality analysis of the cloud stack configuration to determine whether the cloud stack configuration performs the cloud stack request and the specific functionality parameters requested in the cloud stack request. For example, if security is a functionality parameter important to a user for a specific application, cloud stack testing engine 136 may test the security of that application as included in the specific cloud stack configuration, and determine whether it satisfies the security requirement dictated. In some embodiments, when performing the cloud stack configuration test, cloud stack testing engine 136 performs a minimum threshold functionality analysis of the unique cloud stack configuration. Cloud stack testing engine 136 may have a set number of functionality tests that should be run for any unique cloud stack configuration. For example, if cloud stack testing engine 136 only determines a few or no tests, it will still perform the minimum threshold functionality analysis tests to determine that the cloud stack configuration can adequately function. In some embodiments, the cloud stack request may include a minimum threshold for some functionality parameters (e.g., minimum speed, minimum operation). Cloud stack testing engine 136 may access certain predetermined thresholds from memory 134. In optimizing a cloud stack, some functionality parameters may be less prioritized than others, but ensuring that the cloud stack performs above at least a minimum allows cloud stack configuration to be used.

In some embodiments, cloud stack testing engine 136 may analyze the outcomes of the test (e.g., too many errors, too slow, not giving correct output) and indicate whether it performed well for a certain functionality parameter. After each test, if the cloud stack configuration performed well for the specific functionality parameter being tested, cloud stack testing engine 136 may generate a certificate that the unique cloud stack configuration complies with the cloud stack configuration test. Cloud stack testing engine 136 may save that certificate in memory 134 in conjunction with historic cloud stack configuration 138, so that future testing for that cloud stack configuration may be reduced or eliminated. In some embodiments, after all the testing is complete and the cloud stack configuration performed well for the specific functionality parameter being tested, then cloud stack testing engine 136 may generate a certificate that the unique cloud stack configuration complies with each of the performed cloud stack configuration tests.

In some embodiments, cloud stack testing engine 136 determines that the unique cloud stack configuration failed the cloud stack configuration test. Cloud stack testing engine 136 may determine that it failed by analyzing a performance of the cloud stack configuration when using the one or more functionality parameters. In some embodiments, cloud stack testing engine 136 identifies a failed cloud component 112 in the unique cloud stack configuration, the failed cloud component being the component 112 that caused the unique cloud stack configuration to fail the cloud stack configuration test. Cloud stack testing engine 136 may further indicate which cloud component(s) 112 is causing the issue and identify an alternative. In some embodiments, cloud stack testing engine 136, identifies an alternative cloud component to replace the failed cloud component in the unique cloud stack configuration that caused the cloud stack configuration test to fail. As an example, if one functionality parameter includes video streaming with a certain peak load, cloud stack testing engine 136 will create a test to determine whether cloud stack configuration is able to stream videos under that peak load. If the test results show that there were too many errors and/or performance degradation, then cloud stack testing engine 136 may indicate that this cloud stack configuration is not performing well enough, determine that application 112-7 is causing the issue, and suggest replacing it with application 112-8.

In some embodiments, cloud stack testing engine 136 stores results of the cloud stack configuration test and the associated cloud stack configuration in memory 134. Cloud stack testing engine 136 may store the test itself, instructions on execution of the test, the results of the test, the performance metrics, any certificates generated that indicate the unique cloud stack configuration complies with the cloud stack configuration test, any indications that a cloud stack configuration failed the test, any identification of component 112 causing the failure, any components 112 to replace the failed component 112, any tests that were re-executed, and/or any information related to the tests. By storing this information (e.g., as historic cloud stack configurations 138) cloud stack server 130 may reduce or eliminate the number of tests that need to be run for any future cloud stack configurations. By accessing this stored information, cloud stack server 130 may identify workable cloud stack configurations sooner and while reducing the need to use computational resources. Storing the information further allows cloud stack server 130 to use machine learning to identify optimal clouds stack configurations for a user.

Cloud stack tuning engine 137 may be included within cloud stack server 130. Generally, cloud stack tuning engine 137 may analyze a cloud stack configuration's performance and determine whether it is optimized for a user, according to any one of a variety of embodiments suitable for a particular purpose. More specifically, cloud stack tuning engine 137 may be any software, hardware, firmware, or combination thereof capable of analyzing a cloud stack configuration's performance and determining whether it is optimized for a user. According to some embodiments, cloud stack tuning engine 137 may be a set of instructions stored in memory 134 that may be executed by processor 133. In some embodiments, cloud stack tuning engine 137 may receive a cloud stack request, determine which cloud components to use, and analyze the cloud stack configuration performance in view of network parameters. In view of those network parameters, cloud stack tuning engine 137 may determine whether the cloud stack configuration is optimized for a user's requirements.

In some embodiments, cloud stack tuning engine 137 analyzes the performance of cloud stack configuration based on the tests performed by cloud stack testing engine 136. Although described above as cloud stack testing engine 136 analyzing the performance, in some embodiments, this may be performed by cloud stack tuning engine 137, cloud stack configuration engine 135, or any component of cloud stack server 130. Cloud stack tuning engine 137 may receive the test and test results from cloud stack tuning engine 137 and/or from memory 134 in order to analyze the performance. Cloud stack tuning engine 137 may determine whether the cloud stack configuration passed the test (and by how much), failed the test (and by how much), as well as determine why. Cloud stack tuning engine 137 may further identify component 112 causing the failure, and indicate a new component 112 that may replace the failed component. Cloud stack tuning engine 137 may perform any additional analysis necessary in order to reconfigure cloud stack configuration.

In some embodiments, cloud stack tuning engine 137 determines whether the cloud stack configuration is optimized in view of network usage parameters. Cloud stack tuning engine 137 may review all of the tests performed or a certain subset to identify any weak points or issues with the cloud stack configuration. Cloud stack tuning engine 137 may run additional tests to see if replacing component 112 and/or reconfiguring cloud stack configuration would lead to better test results, and/or test results that more specifically match the functionality parameters included in the cloud stack request. Cloud stack tuning engine 137 may utilize machine learning to compare the current cloud stack configuration to historic cloud stack configurations 138, analyze performance metrics of the current cloud stack configuration as well as historic cloud stack configurations, and determine whether the current cloud stack configuration is optimal. Cloud stack tuning engine 137 may determine whether the cloud stack configuration meets exceeds the functionality parameters included in the cloud stack request by balancing the requirements against each other and resulting in a cloud stack configuration that meets the user's request.

In some embodiments, cloud stack tuning engine 137 determines a performance decrease of the cloud stack configuration using the network usage parameters. The performance decrease may be, for example, a slower streaming data rate from the user device. This may occur, for example, after a cloud stack configuration is implemented at user device 120, and a change in network usage causes a performance decrease. This specific network usage may not have been tested by cloud stack testing engine 136, or may be an unforeseen circumstance. If cloud stack tuning engine 137 determines a performance decrease, it (or cloud stack testing engine 136) may initiate further testing of cloud stack configuration to determine whether it needs to be changed and/or updated. Cloud stack tuning engine 137 may identify components that are causing the performance decrease, including what features of that component may be causing the issue.

In some embodiments, cloud stack tuning engine 137 compares the network usage parameters to historic cloud stack configurations 138 to determine a new cloud component. By comparing the cloud stack configuration to historic cloud stack configurations 138, cloud stack tuning engine may spot the similarities and differences between components in the stack to identify potential alternative components 112. In some embodiments, cloud stack tuning engine 137 may determine alternative components 112 that may reduce or remedy the issue, and test the cloud stack configuration with the alternative component(s) to determine whether it remedies the issue before suggesting it as a replacement. In some embodiments, cloud stack tuning engine may determine that the new cloud component 112 is compatible with the cloud stack configuration before identifying it as a suitable replacement.

In some embodiments, cloud stack tuning engine 137 reconfigures the cloud stack configuration by implementing a new cloud component in the cloud stack configuration. If the testing shows that the new cloud component 112 remedies the issue, cloud stack tuning engine 137 may reconfigure the cloud stack configuration. Cloud stack tuning engine may further implement the new cloud stack at user device 120.

In some embodiments, cloud stack tuning engine 137 determines that the new cloud component 112 enhanced the performance of the cloud stack configuration. Cloud stack tuning engine 137 may monitor and/or perform tests on the new cloud stack configuration once it is implemented to ensure that errors or performance degradation does not persist. Cloud stack tuning engine 137 may compare performance statistics to the previous cloud stack with old cloud component 112 (e.g., as saved in historic cloud stack configurations 138), to determine whether the performance has improved. By monitoring this new cloud stack configuration with a replacement cloud component 112, cloud stack tuning engine is able to preemptive determines whether the cloud stack configuration needs any further tuning or reconfiguration.

In one or more embodiments, one or more systems, processes, and/or methods may utilize one or more machine learning systems, processes, and/or methods that may maintain and track data relationships over time. For example, the one or more machine learning systems, processes, and/or methods may determine measures representing a strength of a relationship between or among data files and may build a graph of data objects (e.g., emails, files, videos, images, banking transactions, records, etc.) that include characteristics and/or relationships.

In one or more embodiments, seed data may be classified and/or tagged, based on one or more classifications, and may be provided to the one or more machine learning systems, processes, and/or methods. For example, the one or more machine learning systems, processes, and/or methods may utilize the seed data and tags of the seed data within a graph system to determine additional relationships between or among elements and/or to extend a data graph (e.g., a database) by constructing new tag attributes to capture the additional relationships. For instance, in enabling and/or implementing a cloud stack configuration, specific functionality parameters received from a user may be identified as related to the cloud components in this cloud stack configuration. Further, performance metrics for this cloud stack configuration may be associated with this cloud stack. That may allow cloud stack server 130 to identify similar functionality parameters received from different users, and identify previously used cloud stack configurations that have high performance metrics. This may aid in cloud stack server 130 recommending and implementing appropriate cloud stack configurations to users with similar requirements.

In one or more embodiments, the one or more machine learning systems, processes, and/or methods may statistically measure a strength of an affinity between or among data objects (e.g., relationship between functionality parameter, cloud component, cloud stack configuration, and performance metrics), which may allow and/or may permit one or more results to be specified within one or more confidence intervals. For example, one or more static classification rules and/or tags may be replaced with one or more dynamic correlation scores. For instance, the one or more machine learning systems, processes, and/or methods may be initiated with known related elements, and the one or more machine learning systems, processes, and/or methods may derive additional related data based on one or more correlations and/or one or more stochastics.

In one or more embodiments, relationship discovery may be dynamic and/or may be able to captures evolving one or more relationships between or among data as the data is utilized by one or more systems, processes, and/or methods. For example, the data may be utilized by one or more systems, processes, and/or methods of a cloud computing infrastructure and/or environment. In this fashion, the one or more machine learning systems, processes, and/or methods may provide one or more means to place attributes and/or tags on data objects (e.g., historic cloud stack configurations 138 and/or cloud components 112), according to one or more embodiments.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of cloud networks 110, cloud components 112, user devices 120, and cloud stack servers 130. As another example, particular functions, may be performed by other components, such as cloud stack testing engine 136 and/or cloud stack tuning engine 137 constructing the cloud stack configuration. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates example cloud stack configurations for network devices, according to an embodiment. User device 120-1 (e.g., a desktop computer) has an implemented cloud stack configuration and its different layers. Specifically, cloud components 112 for each layer in the example cloud stack configuration are application 112-8, operating system 112-6, virtual machine 112-1, and hypervisor 112-3. This example cloud stack configuration may be one created by cloud stack configuration engine 135, tested by cloud stack testing engine 136, and reconfigured by cloud stack tuning engine 137 of FIG. 1 after being implemented at user device 120-1. User device 120-2 (e.g., a tablet) also has an example implemented cloud stack configuration and its different layers. Specifically, cloud components 112 for each layer in the example cloud stack configuration are application 112-7, operating system 112-5, virtual machine 112-2, and hypervisor 112-4. These example embodiments of cloud stack configurations indicate how various cloud components 112 may be combined and implemented to create a cloud stack for user device 112. These example cloud stack configuration may be ones created by cloud stack configuration engine 135, tested by cloud stack testing engine 136, and reconfigured by cloud stack tuning engine 137 of FIG. 1 before being implemented at user device 120-1. In some embodiments, after being implemented at user devices 120-1 and 120-2, both of these example cloud stack configurations may undergo further testing, monitoring, and/or reconfiguring by cloud stack server 130. Thus, cloud stack server 130 may ensure that the specific cloud stack configuration for a user device 120 is consistently the optimal cloud stack configuration based on the functionality parameters of the user.

FIG. 3 illustrates an example flowchart for providing cloud stack configuration, cloud stack testing, and cloud stack tuning, using system 100 of FIG. 1. In particular embodiments, various components of system 100 perform the steps in method 300.

The method may begin at step 310. At step 310, in some embodiments, cloud stack server 130 receives a cloud stack request from user device 120. The cloud stack request may include certain functionality parameters requested by a user at user device 120. Examples may include a hardware preference, an operating system preference, a preference for open source, a performance requirement, an application type, preference for high availability, and/or any other feature relating to the operation of cloud stack that the user is requesting cloud stack server 130 to create. Cloud stack server 130 may analyze the user input to determine specific functionality parameters.

At step 320, in some embodiments, cloud stack server 130 identifies one or more cloud components 112 that meet the cloud stack request. Cloud stack server 130 may use the functionality parameters from the cloud stack request and compare them to functionality parameters associated with each cloud component 112 to determine an optimal choice of components 112 to create the cloud stack configuration (e.g., stack shown in FIG. 2).

At step 330, in some embodiments, cloud stack server 130 determines whether cloud component 112 identified in step 320 is compatible with the cloud stack configuration. Each cloud component 112 may have a list of other components 112 that it may compatible or incompatible with in order to facilitate determining compatibility among components. If not compatible, cloud stack server 130 may select one or more new cloud component(s) 112 at step 340. It may use similar techniques as those described above in step 320 to identify a new cloud component. If cloud component 112 is compatible, the method continues to step 350.

At step 350, in some embodiments, cloud stack server 130 determines whether the cloud stack configuration is a unique cloud stack configuration. The cloud stack configuration is unique if the specific combination of components 112 have not been used as a cloud stack configuration by cloud stack server 130 before and/or if no testing data for the cloud stack configuration exists. Cloud stack server 130 may compare the cloud stack configuration to historic cloud stack configurations. Further, cloud stack server 130 may compare specific layers among the different cloud stack configurations to determine which components 112 are similar or different. If, at step 350 cloud stack server 130 determines that the cloud stack configuration is not a unique cloud stack configuration, the method continues to step 352 to begin the process of determining optimization, described further below. If, at step 350 cloud stack server 130 determines that the cloud stack configuration is a unique cloud stack configuration, it would be beneficial for the unique cloud stack combination to be tested, and thus the method continues to step 360.

At step 360, in some embodiments, cloud stack server 130 determines a cloud stack configuration test for the unique cloud stack combination. Based on the functionality parameters and the important features for the cloud stack identified in the cloud stack request, cloud stack server 130 may determine a number of tests to be performed on the unique cloud stack configuration. In some embodiments, cloud stack server 130 may have a set of standard tests to run to ensure minimum functionality of the cloud stack configuration. After determining the cloud stack configuration tests at step 360, then at step 362, in some embodiments, cloud stack server 130 executes the cloud stack configuration test on the unique cloud stack combination. The tests may be performed multiple times, to ensure consistent and accurate data. At step 364, in some embodiments, cloud stack server 130 stores the results of the cloud stack configuration test. These may be stored in memory 134 as historic cloud stack configurations 138, or in any sufficient memory in cloud stack server 130. Once the tests are complete and the cloud stack configuration is verified to work as indicated by the cloud stack request, the method continues to step 370 below to continue with construction the cloud stack configuration.

If, at step 350 cloud stack server 130 determines that the cloud stack configuration is not a unique cloud stack configuration (e.g., the cloud stack configuration has been selected and/or implemented before), the method continues to step 352, where cloud stack server 130 analyzes the cloud stack configuration against historic cloud stack configurations 138 of FIG. 1. Cloud stack server 130 may verify by comparing the cloud stack configurations that it is not a unique configuration. Analyzing the historic cloud stack configurations also allows cloud stack server 130 to see if there are any other cloud stack configurations that may operate at a higher performance than the selected cloud stack for the key features and functionality parameters requested. In this way, cloud stack server 130 is determining the best cloud stack to meet most, if not all, of the functionality parameters requested.

At step 354, in some embodiments, cloud stack server 130 determines whether the identified cloud stack configuration is optimized for the cloud stack request. Cloud stack server 130 may use the analysis from step 352 to facilitate determining whether the cloud stack is optimized. For example, if another cloud stack in historic cloud stack configurations indicates it can satisfy the same functionality parameters while have a higher system performance, then cloud stack server may determine that the selected cloud stack is not optimized. If not, cloud stack server 130 returns to step 340 to select one or more new cloud components 112. In some embodiments, cloud stack server may select new cloud components 112 that match historic cloud stack configuration that was determined to satisfy functionality parameters and have a higher system performance. In some embodiments, cloud stack server 130 may determine that none of the historic cloud stack configurations are able to satisfy the functionality parameters as requested and/or are not able to have as high performance rates. If cloud stack server 130 determines that the identified cloud stack configuration is optimized, then it constructs the cloud stack configuration for user device 120 at step 370. Once the cloud stack configuration is implemented at user device 120, it may continue to be analyzed and monitored (e.g., at steps 380 and 390 described below) to ensure that the cloud stack configuration continues to be the optimal configuration for the needs of the user as requested in the cloud stack request.

At step 380, in some embodiments, cloud stack server 130 analyzes the cloud stack configuration performance in view of network parameters. Once the cloud stack configuration is implemented, it is beneficial to see how it performs when user device 120 interacts with cloud network 110. Operating in real-time with cloud network 110 may be different conditions than were created when performing any previous tests of the cloud stack configuration. Thus, cloud stack configuration may be monitored once implemented to see how it is performing. Network parameters may include any information related to the transfer of data (e.g., between cloud network 110 and user device 120), access to cloud network 110, speed (e.g. of downloads, streaming), quality (buffering), errors, or anything related to the cloud stack configuration's operation. In checking the real-time measurements and statistics of the cloud stack configuration, cloud stack server 130 may see how it is performing. At step 390, in some embodiments, cloud stack server 130 determines whether the cloud stack configuration is optimized in view of network parameters. Cloud stack server 130 may check historic cloud stack configurations 138 to see if any of those have more successful network parameters. If cloud stack server 130 determines that one of its components 112 should be switched, then it determines that the cloud stack configuration is not optimized. If cloud stack server 130 determines that the cloud stack configuration is optimized, the method ends. If not, cloud stack server 130 returns to step 340 to select one or more new cloud components 112 to try to create a cloud stack configuration that is optimized for the user.

Modifications, additions, or omissions may be made to the methods described herein without departing from the scope of the invention. For example, the steps may be combined, modified, or deleted where appropriate, and additional steps may be added. In an embodiment where cloud stack server 130 determines that the cloud stack configuration is not a unique cloud stack configuration, cloud stack server 130 may omit steps 360, 362, and 364 involving testing the cloud stack configuration. As another example, steps 352 and 354 regarding analyzing the cloud stack before implementation may be omitted, and cloud stack server 130 would simply analyze the cloud stack performance after implementation at steps 380 and 390. Additionally, the steps may be performed in any suitable order without departing from the scope of the present disclosure. While discussed as cloud stack server 130 performing certain steps, any suitable component of system 100 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A dynamic cloud stack testing system, comprising:
   a cloud network comprising a plurality of cloud components;
   a cloud stack server communicatively coupled to the cloud network, the cloud stack server comprising:
   an interface operable to receive a cloud stack request from a user device
   a cloud stack configuration engine implemented by a processor operably coupled to the interface, the cloud stack configuration engine configured to:
   identify one or more cloud components;
   determine a cloud stack configuration that incorporates the one or more cloud components; and
   determine whether the cloud stack configuration is a unique cloud stack configuration;
   a cloud stack testing engine implemented by the processor, the stack testing engine configured to:
   in response to determining that the cloud stack configuration is a unique cloud stack configuration, determine a cloud stack configuration test;
   execute the cloud stack configuration test for the cloud stack configuration; and
   wherein the cloud stack testing engine is further configured to:
   determine that the cloud stack configuration failed the cloud stack configuration test;
   identify a failed cloud component in the cloud stack configuration, wherein the failed cloud component caused the cloud stack configuration to fail the cloud stack configuration test; and
   wherein the cloud stack configuration engine is further configured to:
   identify an alternative cloud component to replace the failed cloud component in the cloud stack configuration that caused the cloud stack configuration test to fail.

2. The dynamic cloud stack testing system of claim 1, wherein the cloud stack configuration test analyzes a performance of the cloud stack configuration.

3. The dynamic cloud stack testing system of claim 1, wherein the cloud stack configuration test performs a functionality analysis of the cloud stack configuration to determine whether the cloud stack configuration performs the cloud stack request.

4. The dynamic cloud stack testing system of claim 1, wherein the cloud stack testing engine is further configured to generate a certificate that the cloud stack configuration complies with the cloud stack configuration test.

5. The dynamic cloud stack testing system of claim 1, wherein the cloud stack configuration test performs a minimum threshold functionality analysis of the cloud stack configuration.

6. The dynamic cloud stack testing system of claim 1, wherein the failed cloud component is a hypervisor.

7. A method for dynamic cloud stack testing, comprising:
   receiving, by an interface, a cloud stack request from a user device;
   identifying, by a processor communicatively coupled to the interface, one or more cloud components;
   determining, by the processor, a cloud stack configuration, wherein the cloud stack configuration incorporates the one or more cloud components;

determining, by the processor, whether the cloud stack configuration is a unique cloud stack configuration;
in response to determining that the cloud stack configuration is a unique cloud stack configuration, determining a cloud stack configuration test;
executing, by the processor, the cloud stack configuration test for the cloud stack configuration;
determining that the cloud stack configuration failed the cloud stack configuration test;
identifying a failed cloud component in the cloud stack configuration, wherein the failed cloud component caused the cloud stack configuration to fail the cloud stack configuration test; and
identifying an alternative cloud component to replace the failed cloud component in the cloud stack configuration that caused the cloud stack configuration test to fail.

8. The dynamic cloud stack testing method of claim 7, wherein the cloud stack configuration test analyzes a performance of the cloud stack configuration.

9. The dynamic cloud stack testing method of claim 7, wherein the cloud stack configuration test performs a functionality analysis of the cloud stack configuration to determine whether the cloud stack configuration performs the cloud stack request.

10. The dynamic cloud stack testing method of claim 7, wherein the method further comprises generating, by the processor, a certificate that the cloud stack configuration complies with the cloud stack configuration test.

11. The dynamic cloud stack testing method of claim 7, wherein the cloud stack configuration test performs a minimum threshold functionality analysis of the cloud stack configuration.

12. The dynamic cloud stack testing method of claim 7, wherein the failed cloud component is a hypervisor.

13. A non-transitory computer-readable medium encoded with logic, the logic operable when executed to:
receive a cloud stack request from a user device;
identify one or more cloud components;
determine a cloud stack configuration, wherein the cloud stack configuration incorporates the one or more cloud components;
determine whether the cloud stack configuration is a unique cloud stack configuration;
in response to determining that the cloud stack configuration is a unique cloud stack configuration, determine a cloud stack configuration test;
execute the cloud stack configuration test for the cloud stack configuration;
determine that the cloud stack configuration failed the cloud stack configuration test;
identify a failed cloud component in the cloud stack configuration, wherein the failed cloud component caused the cloud stack configuration to fail the cloud stack configuration test; and
identify an alternative cloud component to replace the failed cloud component in the cloud stack configuration that caused the cloud stack configuration test to fail.

14. The computer-readable medium of claim 13, wherein the cloud stack configuration test analyzes a performance of the cloud stack configuration.

15. The computer-readable medium of claim 13, wherein the cloud stack configuration test performs a functionality analysis of the cloud stack configuration to determine whether the cloud stack configuration performs the cloud stack request.

16. The computer-readable medium of claim 13, wherein the method further comprises generating, by the processor, a certificate that the cloud stack configuration complies with the cloud stack configuration test.

17. The computer-readable medium of claim 13, wherein the cloud stack configuration test performs a minimum threshold functionality analysis of the cloud stack configuration.

* * * * *